Jan. 15, 1935.   E. WANDERSLEB   1,987,765
RANGEFINDER FOR PHOTOGRAPHIC PURPOSES
Filed April 6, 1933   2 Sheets-Sheet 1
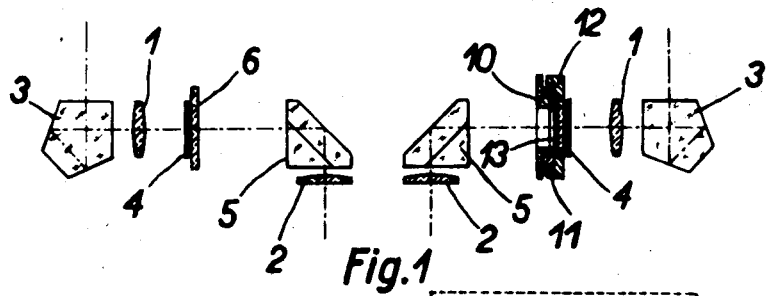
Fig. 1
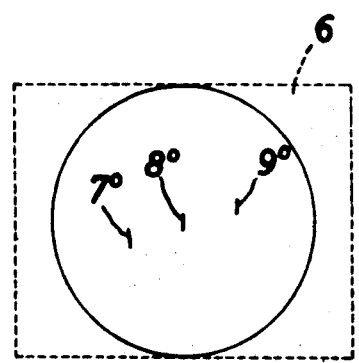
Fig. 2
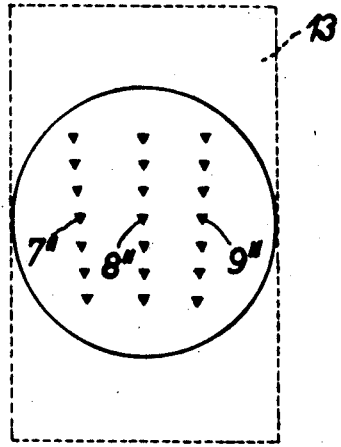
Fig. 3
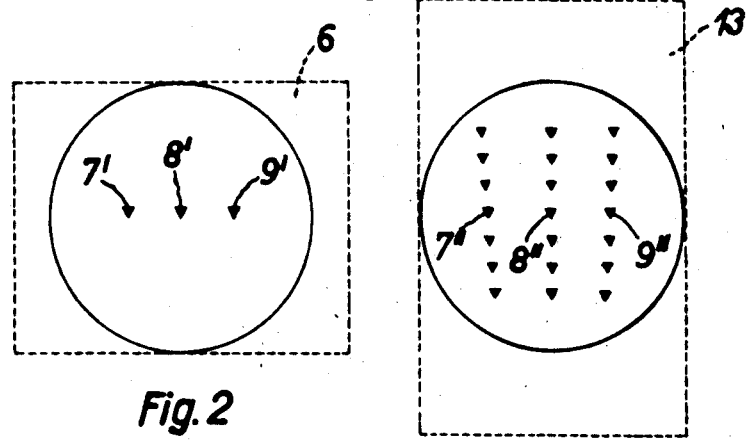
Fig. 4
Fig. 5
Inventor:

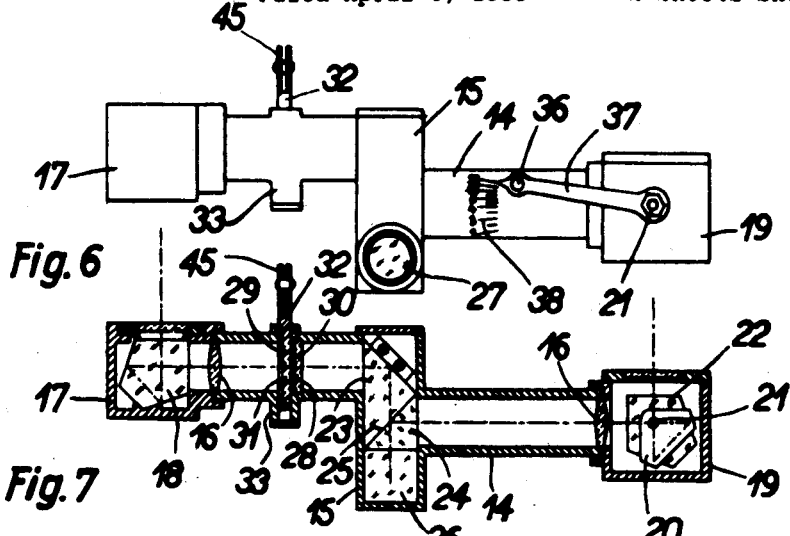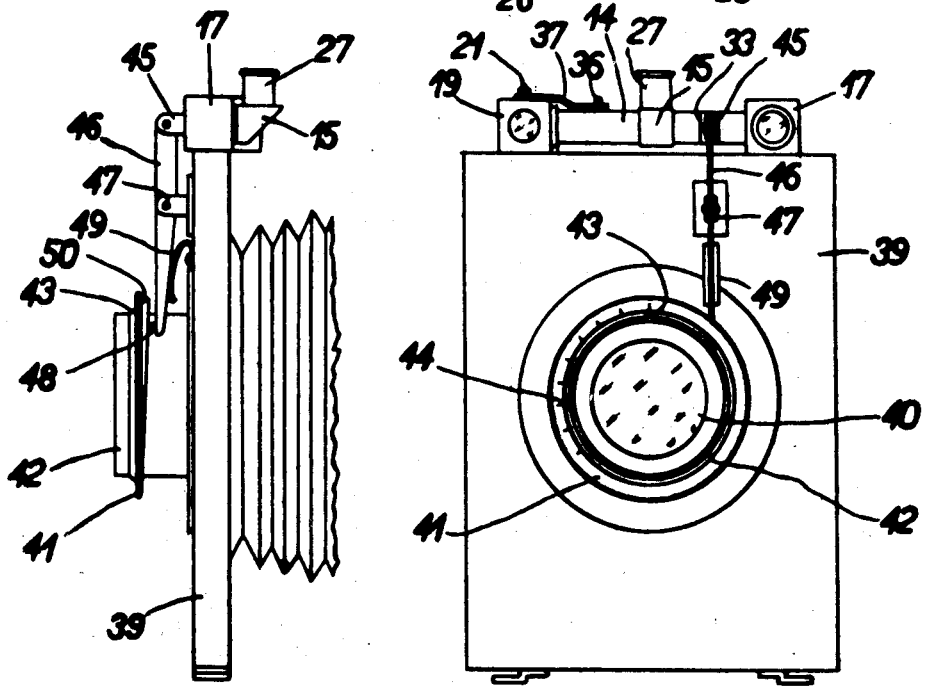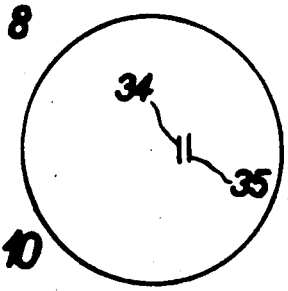

Patented Jan. 15, 1935

1,987,765

UNITED STATES PATENT OFFICE 1,987,765

RANGE FINDER FOR PHOTOGRAPHIC PURPOSES

Ernst Wandersleb, Jena, Germany, assignor to the firm Carl Zeiss, Jena, Germany

Application April 6, 1933, Serial No. 664,785
In Germany April 6, 1932

4 Claims. (Cl. 95—44)

I have filed an application in Germany, April 6, 1932:

Of late, rangefinders are frequently used with a view to facilitating the determination of the adjustment a photographic objective is to be given relatively to the light-sensitive layer in order to obtain a sharp image of an object. As is well known, apart from the imaging errors depending upon the properties of the objective, only such objects may be sharply reproduced simultaneously on a plane layer at right angles to the axis of the objective which lie in a plane at right angles to the axis of the objective, namely in the focusing plane, all points that lie in front or in the rear of the focusing plane being reproduced more or less unsharply, that is to say as greater or smaller circles of dispersion. When the diameter of the circles of dispersion remains below a definite admissible limit, for instance the limit determined by the visual power of the human eye viewing the image, images of such points outside the focusing plane may also be regarded as practically sharp. To the greatest circle of dispersion that may still be regarded as a sharp image of a point is coordinated a parallactic angle difference in the rangefinder, this difference being independent of the range to be adjusted when the focal length and the diaphragm aperture of the objective are not varied. An object point outside the focusing plane is always reproduced as the greatest admissible circle of dispersion when its parallactic angle difference, relative to the corresponding point of the focusing plane, is equal to the greatest admissible parallactic angle difference independently of the distance of the focusing plane. The range difference of the said two object points or, in other words, the depth of the object space whose points are still reproduced sharply, is the greater the greater the distance of the focusing plane from the objective.

The invention is based on the idea of determining by means of the rangefinder not only the distance of the focusing plane from the camera but, at the same time, also the limits of the range in the object space all object points of which are still sharply imaged on the light-sensitive layer by the objective adjusted to the focusing plane. Owing to what has been said hereinbefore, the independence of the parallactic angle difference from the range may be used by providing in the image field of the rangefinder, according to the invention, at least one visible mark indicating the parallactic angle difference between an object point of the focusing plane of the photographic objective and an object point which is outside this plane and whose image in the image plane of the objective is a circle of dispersion equal to the greatest circle still admitting sharp images. As the size of the circles of dispersion and, consequently, the parallactic angle difference, depend upon the size of the diaphragm aperture of the objective, the rangefinder may be so constructed that an observer sees one of a plurality of marks, each of these marks corresponding to a different diaphragm aperture. On account of the parallactic angle difference depending on the focal length of the objective, one mark may be provided for each focal length. Naturally, a mark system of any suitable kind may be used instead of one mark. The mark may be disposed in the image field of the rangefinder itself, or it may be imaged in this image field by optical means. Each object space is conveniently provided with at least two marks. These marks, which are disposed on either side of the focusing plane, provide an information as to the depth of the sharply imaged object space in front of and behind the focusing plane. In this case, the rangefinder is generally equipped also with another mark, that is to say, a mark for the determination of the range of the focusing plane itself. The mark belonging to the adjusting plane may be dispensed with when two marks are at disposal for the determination of the range of the depth of sharpness. Reversely, the marks for the determination of the range of the depth of sharpness may be dispensed with when the mark belonging to the focusing plane is connected with a scale divided to represent ranges in such a manner that two division lines at the sides of a division line coordinated to the focusing plane delimit the range of depth sharpness corresponding to a definite diaphragm aperture for the adjusted distance, and that the next two lines delimit a depth sharpness corresponding to another diaphragm aperture, &c.

When adjusting a monocular self-contained base rangefinder to a point in the object space, two images of all points lying in front or in the rear of the plane of the adjusted point will be produced in the field of view of the rangefinder, these images appearing to be displaced relatively to each other in the direction of the rangefinder base at a definite distance, the parallax. All points whose images have equal parallax have an equal parallactic angle difference relative to the adjusted object point. For this reason it is advisable to so construct monocular rangefinders for photographic purposes that the mark indicates a straight line which is parallel to the rangefinder base and corresponds to the greatest parallax the two images of an object point still sharply reproduced by the objective may have in the image field of the rangefinder adjusted to the focusing plane of the objective. The mark may be, for instance, a line mark distinctly restricted with respect to length or a point mark represented by two short lines or circles.

In stereoscopic rangefinders, the images of the object space are composed of stereoscopic images of the different image points due to stereoscopic combination of the two object-point images appearing in the image field of the ocular. To focus an object point by means of a rangefinder of this kind so as to determine the distance of this point from the camera, the two ocular image fields are provided as a rule with half-images which, when stereoscopically combined, represent a mark at a definite apparent distance. If an object point is at an equal apparent distance, its real distance is known. To determine a definite parallactic angle difference relatively to this object point, a stereoscopic rangefinder is provided with a stereoscopic mark representing this angle difference, the said mark consisting of two half-images that are visible in the image fields of the two oculars, respectively, and lie in the rangefinder, adjusted to the focusing plane of the objective, at the apparent distance of an object point reproduced by the objective as the greatest admissible circle of dispersion. Also in this kind of rangefinders, at least one mark each may be provided for the object spaces at either side of the focusing plane.

As is well known, the objectives of photographic cameras are generally provided with diaphragms permitting to reduce the aperture ratio of the objectives. When giving the diameter of the greatest admissible circle of dispersion always one and the same length, not only the aperture ratio but also the appertaining parallactic angle difference may be varied. For this reason it is advisable to construct the mark in monocular as well as in stereoscopic rangefinders in such a manner that part of the same is so displaceable in the image field that the parallactic angle corresponding to the size of the mark is variable, if it is not preferred to provide one mark for each diaphragm aperture. Finally, a photographic camera provided with a rangefinder of this kind, and whose objective has an adjustable diaphragm, may be so improved that the displaceable part of the mark is coupled to the diaphragm in such a way that the mark indicates that range of depth sharpness for the objective which corresponds to the adjusted diaphragm aperture.

The accompanying drawings represent two constructional examples of the invention. Figure 1 shows schematically the optical parts of a stereoscopic rangefinder according to the first example. Figures 2 and 3 represent the images which an observer sees when looking into the left and the right ocular of the rangefinder, respectively. Figures 4 and 5 show the corresponding images of another constructional form of the first example. Figures 6 and 7 represent in plan the second constructional example, a monocular rangefinder in which the images cover each other, Figure 6 illustrating a top view and Figure 7 a section. Figure 8 represents on a reduced scale a side view of the objective board of a camera used in connection with the second constructional example, and Figure 9 shows this part in front view on the same scale. Figure 10 illustrates the image the view of which is offered to an observer looking into the ocular of this second constructional example.

The stereoscopic rangefinder (Figure 1) consists of two telescopes, each of which has an objective 1 and an ocular 2. In front of each objective 1 is disposed a prism 3 of a pentagonal cross sectional area, these prisms deviating at right angles the entering imaging rays by means of two reflexions. In the image planes of the objectives are disposed diaphragms 4 circularly restricting the image fields. Triangular prisms 5 provide that the imaging rays are deflected once more at right angles, that is to say into the directions of the ocular axes, these prisms 5, whose reflecting surfaces are roof surfaces, not only reversing the two sides of the imaging ray pencil but also the height, as a consequence of which the images produced by the objectives 1 and viewed through the oculars 2 acting as magnifiers are completely reversed. In close proximity to the diaphragm 4 of the telescope at the left is disposed a plano-parallel glass plate 6 that may be displaced horizontally. That surface of this glass plate 6 which faces the diaphragm plane is provided with three point half-images 7', 8', 9' (Figure 2) disposed in a horizontal line. Near the diaphragm 4 of the telescope at the right is placed a slide guide 10 in which a slide 11 may be displaced vertically. The slide 11 itself is constructed also as a slide guide and bears a slide 12 displaceable vertically. In the slide 12 is mounted a plano-parallel glass plate 13 whose surface next to the diaphragm plane has three rows of point half-images (Figure 3). Each three half-images 7'', 8'', and 9'' of these rows lie in a horizontal line. All half-images 8'' of the row in the middle lie in a vertical line.

When using the rangefinder, the half-images 8' and 8'' in the middle serve for measuring the distance of the object to be photographed from the rangefinder, the stereoscopic combination of the half-images 8' and 8'' producing a stereoscopic mark 8 whose apparent distance may be varied by displacing the glass plate 6 and adapted to that of the object to be photographed. The adjusted distance may be found in a known manner on a scale (which is not represented in the drawings). The half-images of each row on the glass plate 13 are conveniently equidistant. When stereoscopically combined, the exterior pairs of half-images 7', 7'' and 9', 9'', which lie in a horizontal line, produce another two stereoscopic marks 7 and 9, of which, according to the drawings, the mark at the left (7) seems to be nearer and the mark at the right (9) farther away from the rangefinder than the mark 8 obtained by stereoscopic combination of the half-images 8', 8''. The pairs of half-images 7', 7'' and 9', 9'' are given such positions on the glass plates 6 and 13, respectively, that, when the rangefinder is adjusted, the apparent distances of the marks 7 and 9 correspond to the distance of object points that are imaged in the image plane as the greatest admissible circles of dispersion by a definite photographic objective adjusted to the apparent distance of the mark 8 and having a definite diaphragm aperture. By displacing the slide 12 and glass plate 13 in the slide 11, the parallactic angle corresponding to the depth of sharpness between the exterior marks 7 and 9 and the mark 8, which is determined by the apparent range difference, may be varied. The displacements are to be effected in such a way that three half-images 7'', 8'', 9'' and three half-images 7', 8', 9', respectively, lie in a horizontal line. Each row determined by the three half-images 7'', 8'' and 9'' may be coordinated to a definite admissible depth of unsharpness which is conveniently indicated in thousandths of the focal length of the objective to be used. If the depth of unsharpness is so determined as to conform to the kind of the object to be photographed, alterations of the diaphragm aperture of the objective which is to be used for an exposure may be taken into account by displacing the glass plate 13 by means of the slide 11 in the slide guide 10.

In a second constructional form of the rangefinder (Figures 4 and 5), the half-images on the glass plate 6 are short lines 7°, 8° and 9° at different heights. Three lines are provided on the glass plate 13, and the diaphragm 4 covers all of the field of view except a strip 4' corresponding to the arrangement and the size of the half-images 7°, 8°, 9°, the consequence being that only parts 7''', 8''' and 9''' of the lines are visible. These parts 7''', 8''' and 9''' correspond to the other half-images of the stereoscopic marks 7, 8 and 9. The arrangement of the lines with the half-images 7''', 8''', 9''' corresponds to that of the rows of half-images 7'', 8'' and 9'' according to the first constructional form. The difference in height of the half-images provides that half-images that do not belong to each other may not be stereoscopically combined when using the instrument. In all other respects this constructional form is used in quite the same way as that according to the first constructional form. By displacing the glass plate 13 vertically, the distance of the half-images 7''', 8''' and 9''' is continuously altered, contrary whereto the distances of the half-images 7'', 8'' and 9'' in the first constructional form can be altered only by degrees.

In addition to adjusting the diaphragm aperture of the objective, the vertical displacements of the glass plate 13 could be used also for adapting the depth measurement to the interpupillary distance of the observer's eyes, and, finally, in variations of the said constructional form of the example, they might be replaced by alterations of convergence of the two exterior lines with the half-images 7''' and 9''' and the two exterior rows of half-images 7'' and 9'', respectively.

The rangefinder according to the second constructional example, in which the images cover each other, has a housing 14 (Figures 6 and 7) the central part of which is constructed to represent a prism housing 15 and whose two ends contain one objective 16 each. In front of the objective 16 at the left, a pentagonal prism 18 is fixedly mounted in a prism housing 17, and in front of the objective 16 at the right a prism holder 20 is mounted in a prism housing 19 in such a manner as to be rotatable about a vertical axle 21, this prism holder 20 containing a pentagonal prism 22. The prism housing 15 contains a ray combining prism whose two parts 23 and 24 are cemented to each other, and in which the cemented surface 25 is semi-transparently silvered. To the prism 24 is connected a triangular prism 26 deviating the imaging rays at right angles towards above into an ocular 27 in the prism housing 15. Close to the focal plane of the objective 16 at the left are the surfaces 28 and 29 of two plano-parallel glass plates 30 and 31. The glass plate 30 is fixedly mounted in the housing 14, and the glass plate 31 is disposed in a slide 32 that may be displaced in a box 33, fixed to the housing 14, parallel to the focal plane of the objective 16 at the left. Each of the surfaces 28 and 29 next to each other has a line mark (Figure 10). As a consequence, the one mark, denominated 34, is stationary and the other, denominated 35, displaceable in horizontal direction. To the axle 21 is fixed an index 37 having a knob 36 and cooperating with a range scale 38 on the housing 14.

In Figures 3 and 9, the rangefinder is assumed to be fixed to the objective board 39 of a photographic camera whose objective 40 is provided with a diaphragm adjustable by means of a knurled ring 41. The mount 42 of the objective is provided in the known manner with an index 43, and the knurled ring 41 bears the appertaining scale 44 representing diaphragm apertures. The slide 32 has a fork 45 into which extends the one arm of a lever 46 rotatable in a bearing 47 on the objective board 39. The other arm of the lever 46 is provided with a knob 48 that is pressed by means of a spring 49 attached to the objective board 39 against the rear surface of the knurled ring 41, which has a guide member 50.

The manner in which rangefinders of the described construction are working is known. Through the semi-transparently silvered cemented surface 25 the images projected by the objectives 16 are visible in the ocular 27 as covering each other, and the images in the object space that are at different distances have different parallax. By turning the index 37 by means of the knob 36 this parallax may be made to disappear for a certain point the distance of which is to be determined. As soon as the two images of the point cover each other in the field of view of the ocular 27, the index 37 indicates on the scale 38 the distance of the point from the instrument. The distance apart of the two marks 34 and 35 corresponds to a definite parallax, that is to say to a definite parallactic angle. This value may altered according to the diaphragm aperture of the objective 40, because altering the diaphragm aperture by rotating the knurled ring 41 entails that the lever 46 with the knob 48 is pressed by the spring 49 and adjusted according to the varied height of the guide member 50. As a consequence, the slide 32 and glass plate 31 as well as the line mark 35 are displaced horizontally, the line mark 34 remaining in its position. The smallest distance apart of the two line marks 34 and 35 is to have such a length that, when the diaphragm is completely open, it indicates the parallax of the images of an object point imaged by the objective 40 as the greatest admissible circle of dispersion when the object 40 sharply images the object point aimed at by the rangefinder. The guide member 50 and the ratio of transmission of the lever 46 are to be so chosen that reducing the diaphragm aperture entails that the distance apart of the line marks 34 and 35 is increased to that parallax which pertains to such points in the object space that are imaged by the objective 40 as the greatest admissible circles of dispersion. When the distance of the object to be photographed has been determined by means of the rangefinder, the objective board 39 of the camera is adjusted according to this distance, and the diaphragm is given an aperture corresponding to the exposure. By adjusting the diaphragm by means of the knurled ring 41, also the depth of sharpness necessary for the exposure is adjusted. This depth of sharpness may be determined by choosing in the object space two points, one before and one behind the object to be photographed, whose two images may be made to cover simultaneously the line marks 34 and 35, respectively. The range difference of the two object points found in this manner comprises that part of the object space within which all points are still sharply imaged by the objective 40. Accordingly, the diaphragm aperture for the photographic objective 40 is determined by means of the line marks 34 and 35 for a photographic object of a definite depth.

I claim:

1. A monocular self-contained base rangefinder for photographic purposes, comprising a casing, two objective prism systems, two objectives for projecting two object images in their focal planes, respectively, a reflecting system for combining the imaging ray pencils, an ocular, the focal plane of the said ocular coinciding with the focal planes of the said objectives, the said optical elements being supported in the said casing, one of the said objective prism systems being rotatable about an axis at right angles to the optical axis of one of the said objectives, and a glass plate so fixed in the casing that one of its surfaces coincides with the focal plane of one of the said objectives, a mark being provided in the said focal plane coinciding with the said surface of the glass plate, the said mark indicating a straight line parallel to the base of the rangefinder, this line corresponding to the parallax between the images of two object points at different distances from the observer.

2. In a rangefinder according to claim 1, another glass plate parallel to and in proximity of the first said glass plate, the said mark consisting of two elements, the distance apart of the two elements corresponding to a linear distance parallel to the base of the rangefinder, this linear distance corresponding to the parallactic angle difference between two object points at different distances from the observer, the said two elements of the mark being provided on the adjacent surfaces of the said two glass plates, the said other glass plate being displaceable parallel to the first said glass plate for varying the said linear distance, and means for moving the displaceable glass plate.

3. A photographic camera containing a photographic objective, an adjustable diaphragm provided on the said objective, means for adjusting the said diaphragm, and a monocular self-contained base rangefinder according to claim 1 fixed to the camera, the said rangefinder containing another glass plate parallel to and in proximity of the first said glass plate, the said mark consisting of two elements, the distance apart of the two elements corresponding to a linear distance parallel to the base of the rangefinder, this linear distance corresponding to the parallactic angle difference between two object points at different distances from the observer, the said two elements of the mark being provided on the adjacent surfaces of the said two glass plates, the said other glass plate being displaceable parallel to the first said glass plate for varying the said linear distance, means for moving the displaceable glass plate and other means for so coupling the said means for adjusting the said adjustable diaphragm to the said means for moving the displaceable glass plate that the distance of the two elements of the said mark is increased according to the decrease of the length of the diameter of the aperture of the said diaphragm and vice versa.

4. A stereoscopic rangefinder for photographic purposes, comprising a casing, two objective prism systems, two objectives for projecting two object images in their focal planes, respectively, two reflecting systems and two oculars, the focal planes of the said oculars coinciding with the focal planes of the said objectives, respectively, two glass plates so provided in the said casing that one of the surfaces of these glass plates coincides with the focal planes of the said objectives, respectively, at least one of the said glass plates being displaceable in the direction of the base of the rangefinder, and two mark elements provided on the said surfaces, respectively, of the said glass plates, the stereoscopical mark obtained by stereoscopic combination of the said two mark elements lying at the apparent distance of an object point having a distance from the observer which is different from the distance of the adjusting plane of the rangefinder from the observer.

ERNST WANDERSLEB.